(12) United States Patent
Burshtain et al.

(10) Patent No.: US 9,406,927 B1
(45) Date of Patent: Aug. 2, 2016

(54) METHOD OF PREPARING AN ANODE FOR A LI-ION BATTERY

(71) Applicant: StoreDot Ltd., Herzeliya (IL)

(72) Inventors: Doron Burshtain, Rehovot (IL); Daniel Aronov, Netanya (IL); Yaniv Damtov, Rehovot (IL)

(73) Assignee: StoreDot Ltd., Herzeliya (IL)

( * ) Notice: Subject to any disclaimer, the term of this patent is extended or adjusted under 35 U.S.C. 154(b) by 0 days.

(21) Appl. No.: 15/015,765

(22) Filed: Feb. 4, 2016

(51) Int. Cl.
*H01M 4/88* (2006.01)
*H01M 4/04* (2006.01)
*H01M 10/0525* (2010.01)
*H01M 4/1395* (2010.01)
*H01M 4/02* (2006.01)

(52) U.S. Cl.
CPC .......... *H01M 4/0471* (2013.01); *H01M 4/1395* (2013.01); *H01M 10/0525* (2013.01); *H01M 2004/027* (2013.01)

(58) Field of Classification Search
CPC ..... H01M 4/13; H01M 4/387; H01M 4/1395; B22F 9/002; B22F 9/104
USPC ............................................... 252/182.1, 516
See application file for complete search history.

(56) References Cited

U.S. PATENT DOCUMENTS

| | | | | |
|---|---|---|---|---|
| 6,541,156 B1 * | 4/2003 | Fuse | ...................... | H01M 4/13 252/182.1 |
| 7,906,238 B2 * | 3/2011 | Le | .......................... | B22F 9/002 252/516 |

FOREIGN PATENT DOCUMENTS

EP CN101734675 * 6/2010 ............. C01B 33/32

OTHER PUBLICATIONS

Kasavajjula et al. "Nano- and bulk-silicon-based insertion anodes for lithium-ion secondary cells" Journal of Power Sources 163 (2007) 1003-1038; Nov. 9, 2006.
Kennedy et al. "High-Performance Germanium Nanowire-Based Lithium-Ion Battery Anodes Extending over 1000 Cycles Through in Situ Formation of a Continuous Porous Network" Nano Lett., Jan. 13, 2014, pp. 716-723.
Wang et al. "The dimensionality of Sn anodes in Li-ion batteries" *Materialstoday*, Dec. 2012 | vol. 15 | No. 12 | pp. 544-552.
Nitta et al. "High-Capacity Anode Materials for Lithium-Ion Batteries: Choice of Elements and Structures for Active Particles" Part. Part. Syst. Charact. Oct. 2014, 31, 317-336.
Hwang et al. "Mesoporous Ge/GeO2/Carbon Lithium-Ion Battery Anodes with High Capacity and High Reversibility" ACS Nano, Apr. 2015, 9 (5),pp. 5299-5309.

(Continued)

*Primary Examiner* — Khanh Tuan Nguyen
(74) *Attorney, Agent, or Firm* — Pearl Cohen Zedek Latzer Baratz LLP

(57) ABSTRACT

A method of preparing an anode for a Li-ion Battery comprises mixing metal particles containing at least one of Ge, Sn and Si particles with carbon particles to form a mixture, and deoxidizing the metal particles by heating the mixture in a vacuum atmosphere in a range of $10^{-3}$ to $10^{-6}$ mbar for 60-100 hours at a temperature in a range of 150 to 350° C. to form a deoxidized mixture, the deoxidation improves the Li ion absorption performance of the anode.

7 Claims, 3 Drawing Sheets

(56) References Cited

OTHER PUBLICATIONS

Balomenos et al. Exergy Analysis of Metal Oxide Carbothemic Reduction under Vacuum—Sustainability prospects International Journal of Thermodynamics (IJoT) vol. 15 (No. 3), pp. 141-148, Jun. 4, 2012.

Barton et al "The Reduction of Germanium Dioxide With Graphite at High Temperatures" Journal of the Less-Common Metals, pp. 11-17, Mar. 9, 1970.

* cited by examiner

METHOD OF PREPARING AN ANODE FOR A LI-ION BATTERY

BACKGROUND OF THE INVENTION

Forming nano-structured alloys may involve some degree of oxygen contamination. Nano-size particles and in particular nano-size metallic particle are highly reactive having high surface to volume ratio. Therefore, nano-size metallic particles will be easily contaminated by oxygen atoms at almost every step in the manufacturing process. For example, oxygen may be included on the surface of the raw materials (metallic and non-metallic powders) and oxygen may react with the raw material powders during mixing or milling of the powders and even during storage of the mixture. Regardless of the protective atmosphere that is provided at each production stage, some oxygen atoms will be absorbed by and react with the surface of the nano-size metallic particles.

Therefore, in order to remove the undesired oxygen atoms several deoxidation processes may be applied at various production stages. Most commonly used deoxidation methods involve heating the nano-size metallic particles to an elevated temperature above the activation energy temperature of the metal atom-oxygen chemical bond for a relatively long time (e.g., several days) to form $O_2$ molecules. When using metalloids (e.g., Si, Ge etc.) or post-transition metals (e.g., Sn, Pb) nano-particles in alloys, for forming electrodes or other electronic components, reducing the amount of oxygen in the final alloy may affect the quality and functionality of the electronic component.

SUMMARY OF THE INVENTION

To improve performance of a Li ion battery anode comprising nano-sized metallic particles, the invention comprises mixing metal particles with carbon (e.g. graphite) particles to form a mixture, wherein the metal particles comprises at least one of: Ge, Sn and Si; and deoxidizing the metal particles in the mixture by heating the mixture in a vacuum atmosphere in a range of $10^{-3}$ to $10^{-6}$ mbar for 60 to 100 hours at a temperature in a range of 150 to 350° C. to form a deoxidized mixture.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
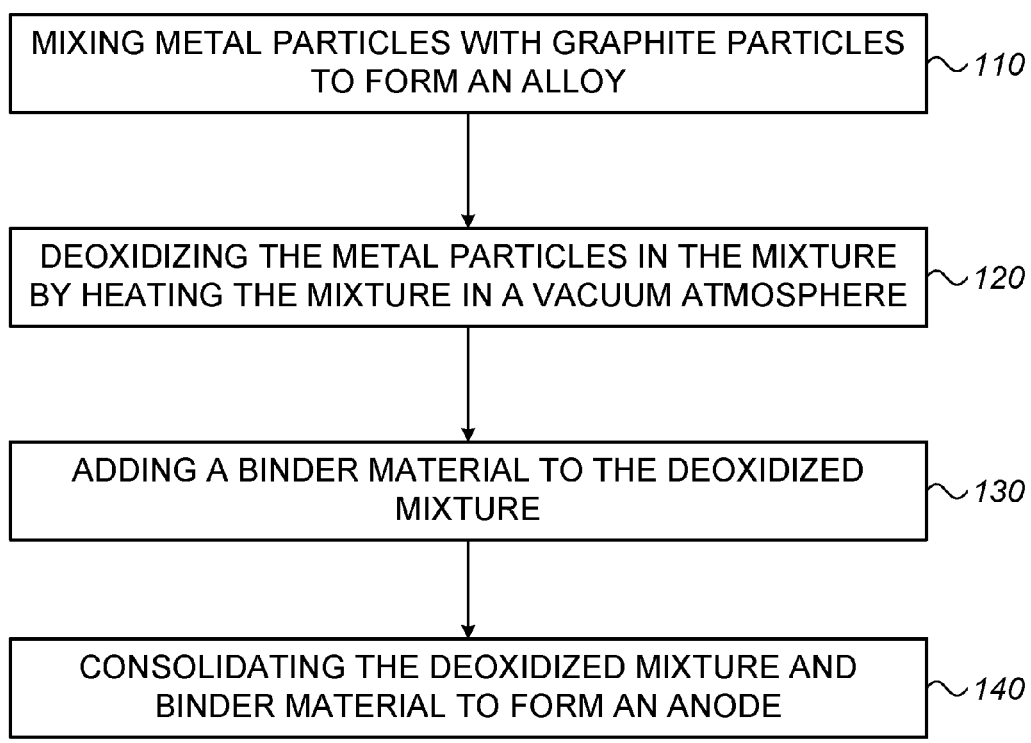
FIG. 1 is a flowchart of a method of preparing an anode for a Li-ion Battery according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Metalloids such as Si and Ge are used in electronic devices, including as electrodes in Li-ion batteries. In order to improve performance, the alloy included in the device may include nano-size particles. Such a microstructure may be highly sensitive to oxidation. For example, when metalloids are included in an anode for a Li-ion battery, the oxygen may form metalloid-oxides (e.g., $GeO_2$, $SiO_2$, etc.) on the free surface of the anode thus reducing the ability of the metalloid to absorb the Li ions. It is therefore required to reduce the amount of oxides in the metalloid alloy. In some embodiments, it may be required to reduce oxygen content in other nano-size metallic alloys.

In some embodiments, reducing the amount of oxygen contamination in a nano-size metallic alloy may be performed at one or more of the production stages of the alloy. A metallic alloy may be prepared by mixing (e.g., ball milling) metallic powder with one or more additives. The one or more additives may include non-metallic materials (e.g., carbon powder), metals (e.g., Sn) and/or compounds (e.g., $B_4C$). The various alloying materials may be mixed together, for example, milled in a ball mill. The as-milled alloy may be deoxidized by heating the mixture in a vacuum atmosphere.

Reference is now made to FIG. 1, which is a flowchart of a method of preparing an alloy according to some embodiments of the invention. The alloy may be included in an anode for Li-ion batteries or in any other device. The method may include, in box 110, mixing metal particles with carbon particles. As used herein, "metal" and "metallic" are construed broadly to include metalloids. The metal particles may include at least one of: Ge, Sn and Si. For example, predetermined amounts of metal powder (including metalloids) and carbon may be placed in a ball mill under protective atmosphere. The ball mill may include hardened alumina balls and may spin at at least 650 RPM. In embodiments, the ball mill may spin at 1000, RPM, 1200 RPM, 1300 RMP or more. The alloy may be milled for at least 45 hours, for example, 48 hours, 55 hours, 60 hours or more.

In some embodiments, the particle size of the raw metal and carbon powder may be under 500 nm, for example, between 100-500 nm Some exemplary alloys may include Si and C, Ge and C, Ge, Si and C, or Ge, Sn and C. In some embodiments, carbides such as $B_4C$ may be added prior to the alloying process to the metal and carbon mixture and may further be milled together to form the alloy.

The method may include, in box 120, deoxidizing the metal particles in the mixture by heating the mixture in a vacuum atmosphere of $10^{-3}$-$10^{-6}$ mbar for 60-100 hours at a temperature of 150-350° C. The deoxidizing process may take place in a vacuum oven. During the deoxidizing process the mixture may be held in a stainless steel container. The vacuum atmosphere may be formed by pumping (using any suitable vacuum pump that can form a vacuum atmosphere of $10^{-3}$-$10^{-6}$ mbar in a vacuum oven) any gases formed or released during the deoxidation process, for example, CO.

Continuous pumping of gases during the deoxidation process may ensure a vacuum level of $10^{-3}$-$10^{-6}$ mbar.

An exemplary deoxidation process of Ge—C—B alloy may include milling the Ge, carbon (e.g., graphite) and $B_4C$ powders in a ball mill at 1300 RPM for 4-10 hours. The high milling velocity may cause alloying of the Ge with the $B_4C$ and optional coating of the alloy with carbon. The as-milled mixture may be placed in a vacuum oven, at a temperature of about 200° C. and vacuum pressure lower than $10^{-3}$ bar for at least 60 hours. Since the Ge—O bond energy is close to the O—O bond energy the ability to break the Ge—O bond in order to form an $O_2$ molecule is limited and may require higher temperatures. However, the C—O bond energy is almost half of that of the O—O therefore carbon included in the alloy may react with the undesired oxygen to form CO molecules at a relatively lower temperature, for example at about 200° C. The CO gas formed during the deoxidation process may be removed from the oven due to the low vacuum pressure (e.g., by continuously pumping the gasses from the vacuum furnace).

In some embodiments, the method may further include adding WC particles to the deoxidized mixture. In some embodiments, adding the WC particles is done by adding a nano-powder that includes nano-size WC particles. For example, the WC may have an average particle size of less than 200 nm, for example, less than 100 nm. In some embodiments, the deoxidized mixture (with or without WC) may be held under a protective atmosphere, for example, under argon atmosphere. In some embodiments, the method may further include adding conductive additives to the deoxidized mixture. The conductive additives may include carbon powder, carbon nan-tubes, or the like.

The method may include, in box 130 adding a binder material to the deoxidized mixture. The binder material may be any commercial polymeric binder that is configured to consolidate powders (e.g., nano-metallic powders). An exemplary material for forming anodes may include binder material at a weight percentage of in a range of about 0.01 to 5 weight % of the total weight of the anode material.

The method may include, in box 140, consolidating the deoxidized mixture and binder material to form an anode. An exemplary consolidation process may include drying the deoxidized mixture and binder material to form a consolidated anode, such as by holding in a drying cabinet at a required temperature. The required temperature may be determined to suit the binder material used. In some embodiments, the deoxidized mixture and binder may be dried at 25-150° C., for example, at 70° C., 100° C. or 120° C.

Figure 2:
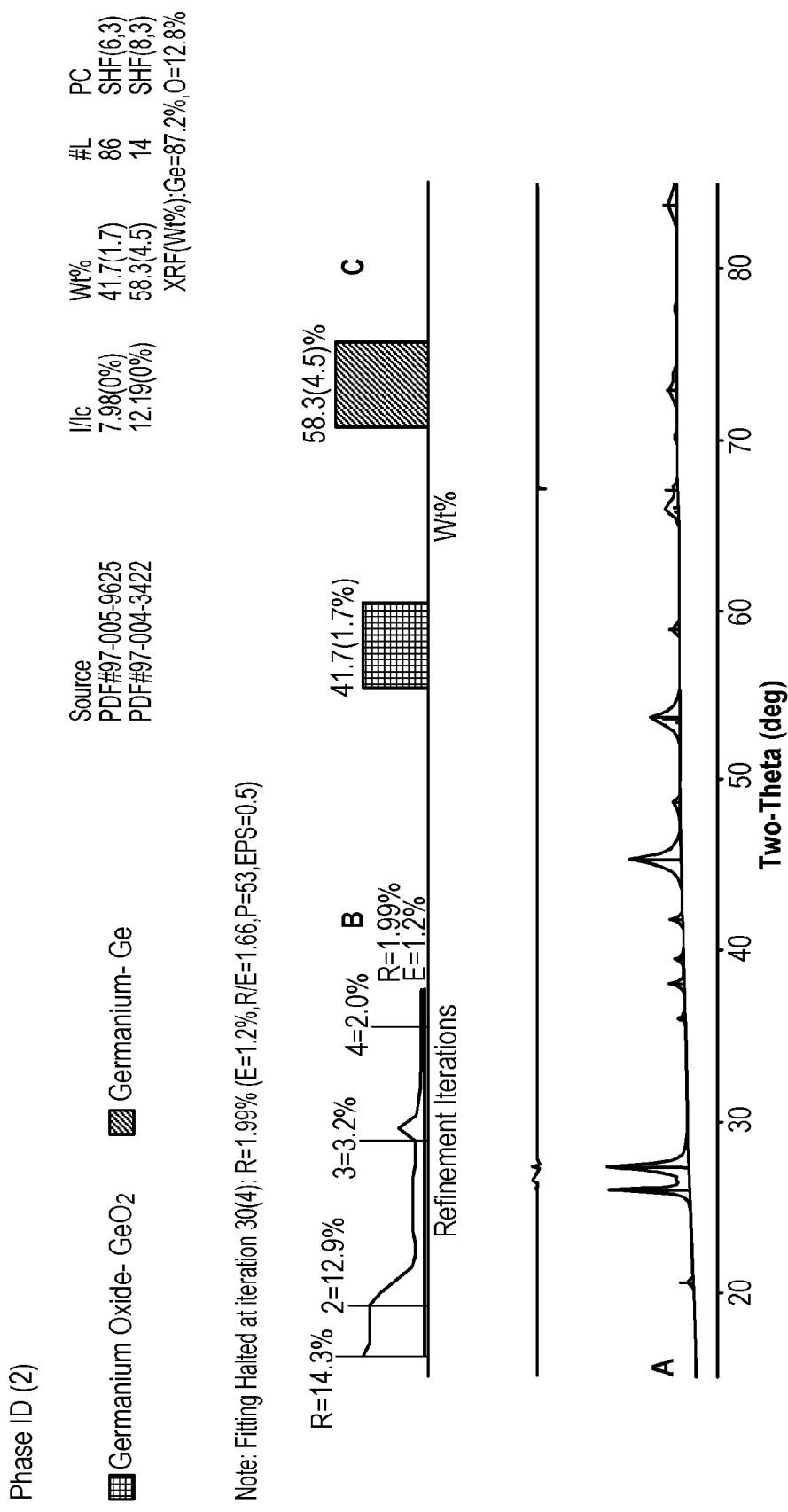
FIG. 2 is an X-Ray Diffraction (XRD) spectrum of an anode material prior to a deoxidation process according to some embodiments of the invention.

Reference is now made to FIG. 2 that shows graphs of: A) a measured XRD spectrum for germanium and germanium-oxide ($GeO_2$); B) a calculated graph presenting amounts of germanium and germanium-oxide; and C) a bar diagram presenting the calculated relative amounts of germanium and $GeO_2$ derived from spectrum A of an anode alloy mixture prior to the deoxidation process, according to some embodiments of the invention. An alloy comprising Ge nano-particles, with 5 weight % boron (added as $B_4C$) and 7 weight % carbon (e.g., graphite), was milled together to form an alloy comprising Ge—C—B contaminated with an undesired oxygen (in the form of $GeO_2$). Graph A shows the XRD maxima (peaks) correlated to different materials (to diffraction from specific crystallographic plans) Graphs B and C show calculated results based on the measured XRD spectrum. The calculation included maxima related to germanium and $GeO_2$, neglecting the presence of carbon and boron. The relative amount of germanium in the as milled alloy was calculated to be 58.3±4.5 weight % and the relative amount of $GeO_2$ was calculated to be 41.7±1.7 weight %.

Figure 3:
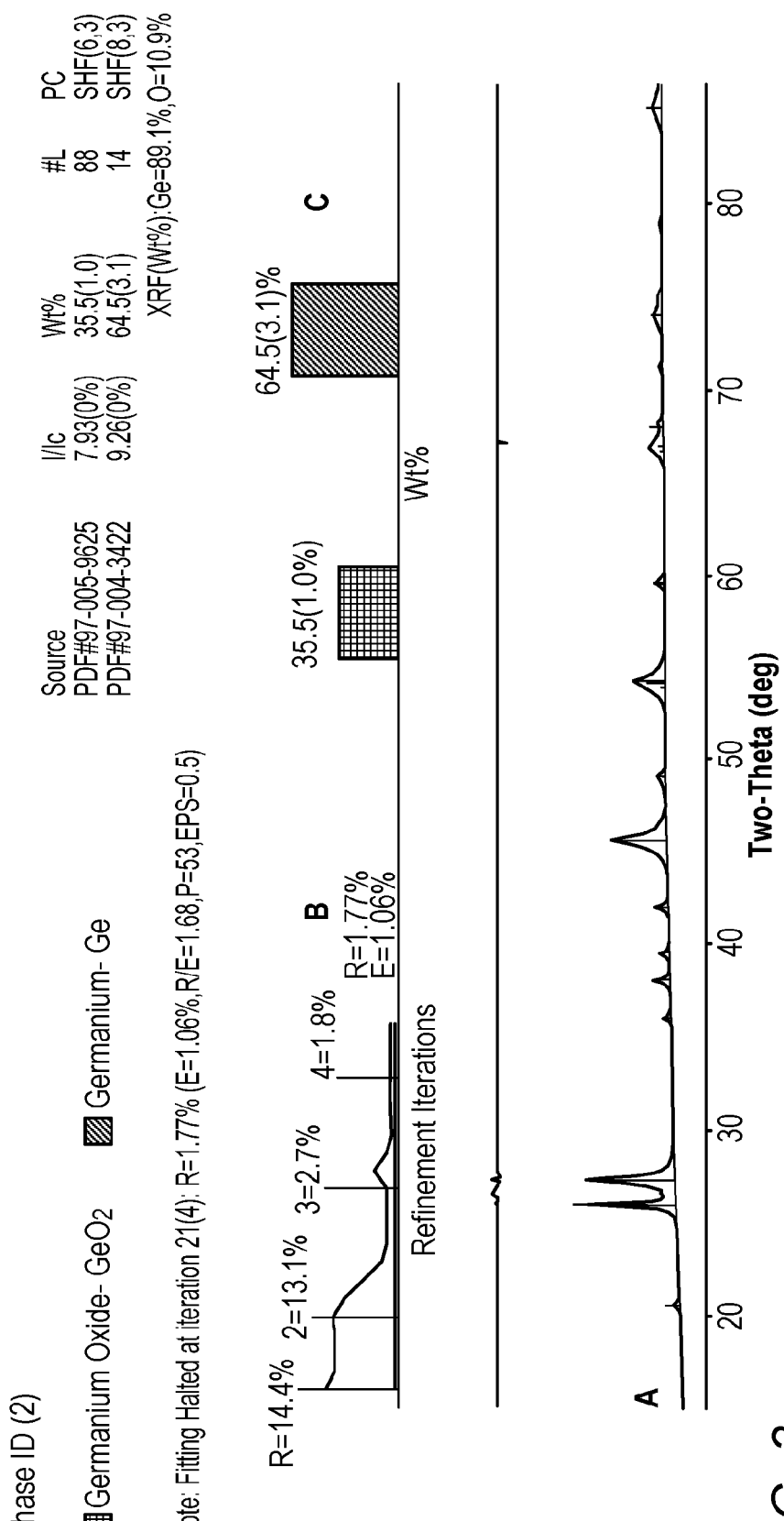
FIG. 3 in an XRD spectrum of the anode material of FIG. 2 after the deoxidation process according to some embodiments of the invention.

Reference is made to FIG. 3 that shows graphs of: A) a measured XRD spectrum for germanium and germanium-oxide ($GeO_2$); B) a calculated graph representing amounts of germanium and germanium-oxide; and C) a bar diagram representing the calculated relative amounts of germanium and $GeO_2$ derived from spectrum A of the anode alloy mixture of FIG. 2 after the deoxidation process, according to some embodiments of the invention. The relative amount of germanium in the deoxidized alloy was calculated to be 64.5±3.1 weight % and the relative amount of $GeO_2$ was calculated to be 35.5±1.0 weight %. As can be seen, there is a dramatic reduction in the amount of the undesired oxygen after the deoxidation process.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of preparing an anode for a Li-ion battery, comprising:
   mixing metal particles with carbon particles to form a mixture, wherein the metal particles comprises at least one of: Ge, Sn and Si;
   deoxidizing the metal particles in the mixture by heating the mixture in a vacuum atmosphere in a range of $10^{-3}$ to $10^{-6}$ mbar for 60-100 hours at a temperature in a range of 150 to 350° C. to form a deoxidized mixture;
   adding a binder material to the deoxidized mixture; and
   consolidating the deoxidized mixture and binder material to form an anode.

2. The method of claim 1, wherein mixing includes milling the metal particles and carbon particles in a ball mill.

3. The method of claim 1, further comprising adding $B_4C$ particles to the metal particles and carbon particles prior to mixing.

4. The method of claim 1, further comprising adding WC particles to the deoxidized mixture.

5. The method of claim 1, further comprising adding conductive additives to the deoxidized mixture.

6. The method of claim 1, wherein the mixture is held in a stainless steel container during deoxidation of the metal particles.

7. The method of claim 6, including removing evolved CO from the container during deoxidation of the metal particles.

* * * * *